United States Patent [19]

McMurtry et al.

[11] 4,218,622
[45] Aug. 19, 1980

[54] NEUTRON ABSORBING ARTICLE AND METHOD FOR MANUFACTURE THEREOF

[75] Inventors: Carl H. McMurtry, Youngstown; Robert G. Naum, Lewiston; Paul F. Forsyth, Niagara Falls, all of N.Y.

[73] Assignee: The Carborundum Company, Niagara Falls, N.Y.

[21] Appl. No.: 870,237

[22] Filed: Jan. 17, 1978

[51] Int. Cl.² ............................................. G21C 11/00
[52] U.S. Cl. ................................... 250/518; 250/519
[58] Field of Search ........................ 250/517, 518, 519

[56] References Cited

U.S. PATENT DOCUMENTS

| 1,609,682 | 12/1926 | Angebaud | 250/517 |
| 2,796,411 | 6/1957 | Zirkle | 250/518 |
| 2,796,529 | 6/1957 | Morrison | 250/518 |
| 2,991,368 | 7/1961 | Reissner | 250/518 |
| 4,027,377 | 6/1977 | Roszler | 250/517 |

FOREIGN PATENT DOCUMENTS

| 2037514 | 2/1972 | Fed. Rep. of Germany | 250/517 |
| 2263676 | 7/1973 | Fed. Rep. of Germany | 250/517 |

*Primary Examiner*—Harold A. Dixon
*Attorney, Agent, or Firm*—David E. Dougherty; Robert C. Weber; Raymond F. Kramer

[57] ABSTRACT

A composite, neutron absorbing, coated article, suitable for installation in storage racks for spent nuclear fuel and for other neutron absorbing applications, includes a backing member, preferably of flexible material such as woven fiberglass cloth, a synthetic organic polymeric coating or a plurality of such coatings on the backing member, preferably of cured phenolic resin, such as phenol formaldehyde or trimethylolphenol formaldehyde and boron carbide particles held to the backing member by the cured coating or a plurality of such coatings. Also within the invention is a method for the manufacture of the neutron absorbing coated article and the use of such an article. In a preferred method the backing member is first coated on both sides thereof with a filling coating of thermosettable liquid phenolic resin, which is then partially cured to solid state, one side of the backing member is then coated with a mixture of thermosettable liquid resin and finely divided boron carbide particles and the resin is partially cured to solid state, the other side is coated with a similar mixture, larger boron carbide particles are applied to it and the resin is partially cured to solid state, such side of the article is coated with thermosettable liquid phenolic resin, the resin is partially cured to solid state and such resin, including previously applied partially cured resins, is cured to final cross-linked and permanently set form.

16 Claims, 5 Drawing Figures

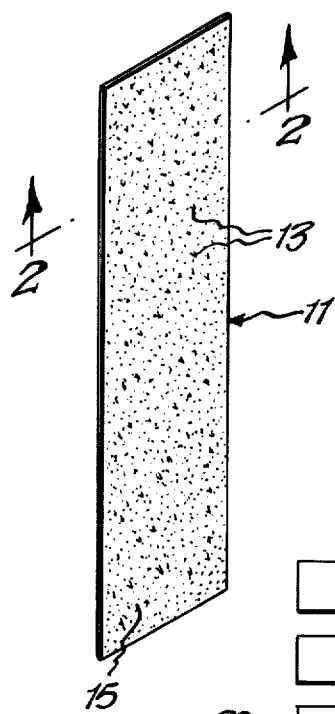
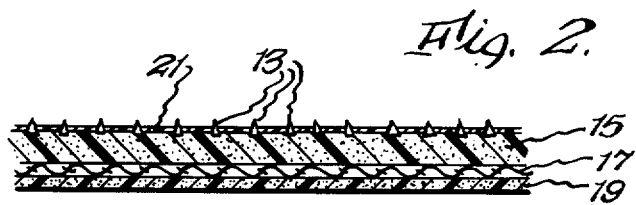
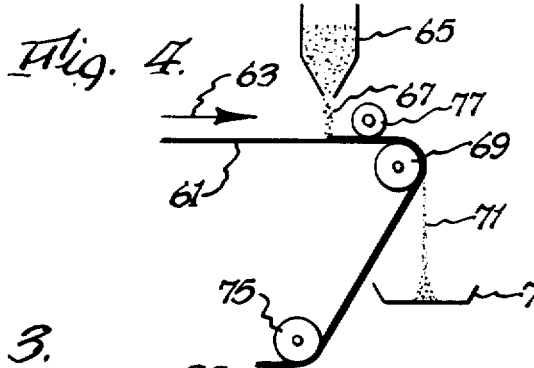
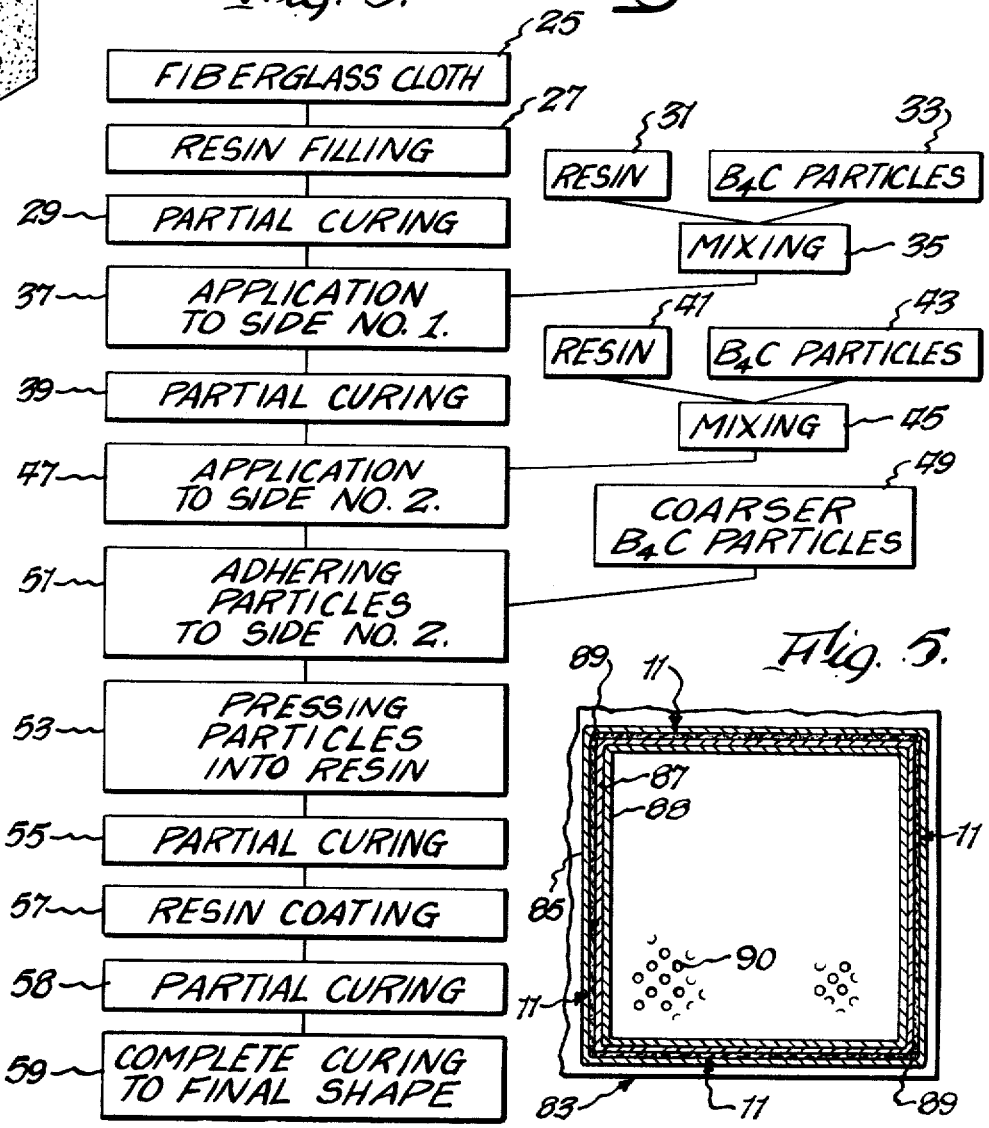
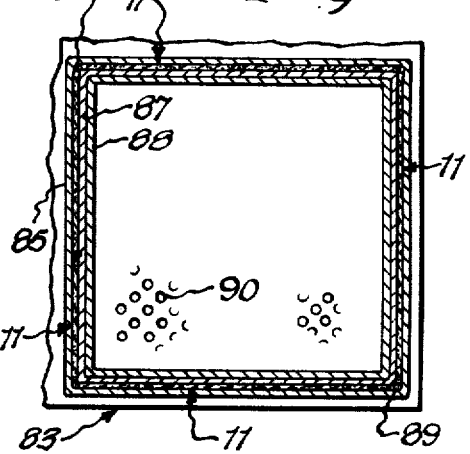

NEUTRON ABSORBING ARTICLE AND METHOD FOR MANUFACTURE THEREOF

This invention relates to a neutron absorbing article. More particularly, it relates to a composite, neutron absorbing, coated article wherein boron carbide particles are utilized as the neutron absorber. The invention also relates to the manufacture of such articles and to uses thereof.

Neutron absorbing articles are known in which boron carbide particles (or the $B^{10}$ content thereof) are the primary active neutron absorbing materials. U.S. Pat. Nos. 2,942,116 and 3,133,887 describe boron carbide and other boron compounds in polymeric matrices for the manufacture of products which are useful as neutron absorbers. U.S. patent applications Ser. No. 854,966 of McMurtry, Naum, Owens and Hortman, for Neutron Absorbing Article and Method for Manufacture of Such Article, filed Nov. 25, 1977; Ser. No. 856,378 of Roger S. Storm, entitled One-Step Curing Method for Manufacture of Neutron Absorbing Plates, filed Dec. 1, 1977; Ser. No. 866,102 of Owens for Method for Manufacture of Neutron Absorbing Articles, filed Dec. 30, 1977; and Ser. No. 866,101 of Naum, Owens and Dooher for Neutron Absorbing Article, filed Dec. 30, 1977 all relate to neutron absorbing articles, specifically plates, wherein boron carbide particles are dispersed in a phenolic polymer matrix. Such applications are hereby incorporated by reference for their disclosures of boron carbide particles and characteristics thereof, phenolic resins and polymers, other materials, methods and uses and other disclosures therein. Additionally, U.S. Pat. Nos. 2,796,411; 2,796,529; 2,858,451; 2,928,948; 2,991,368; 3,016,463; and 3,061,491 all relate to sheets or laminates including neutron absorbing materials such as boron compounds, e.g., boron carbide, in polymeric matrices. However, none of such patents describes the highly preferred products and processes of this invention and none is for products and processes possessing the distinct advantages of those described in this application. Thus, U.S. Pat. No. 2,796,411 is for a methyl methacrylate shield containing boron carbide. U.S. Pat. No. 2,796,529 describes a radiation shield in which a boron or calcium borofluoride powder is mixed with synthetic resin and sheets of the resin mix may be laminated with other materials. U.S. Pat. No. 2,858,451 relates to a laminated ray shielding material comprising three sheets, one of which is a heavy metal, another of which is a metallic reflector and the third of which is a resin bonding the first two together. U.S. Pat. No. 2,928,948 is also for a laminate which may include metals and fibrous materials, among which glass fabric or fibers are mentioned, and it is recited that boron compounds may be utilized. However, in such products a layer of boron in a binder is held to a lead sheet by a resin layer. U.S. Pat. No. 2,991,368 also describes laminates wherein resin impregnated paper film is used to bond a layer of boric oxide and a thin layer of phenolic resin. In such case the powdered loading material, e.g., boric oxide, is poured over an adhesive surface which readily captures it as a single layer. U.S. Pat. No. 3,016,463 is for a vessel having a neutron absorbing layer in the wall thereof, which layer may be composed of boron carbide powder. Finally, U.S. Pat. No. 3,061,491 teaches impregnation of a fabric substrate with a prime plastisol coat which may be laminated. The plastisol coat may include neutron absorbing materials such as heavy metals, e.g., lead. None of such patents describes the present invention.

In accordance with the present invention a composite, neutron absorbing, coated article comprises a backing member, a synthetic organic polymeric coating or a plurality of such coatings on said backing member and boron carbide particles held to said backing member by said coating or plurality of said coatings. Preferably, the backing member is a woven fiberglass cloth and the synthetic organic polymeric coating is a cured and essentially or completely cross-linked phenolic polymer, such as a thermoset trimethylolphenol formaldehyde or phenol formaldehyde polymer. Also within the invention is a method for the manufacture of such neutron absorbing coated articles and an apparatus in which such articles may be installed so as to act as neutron shields or "poison plates" about nuclear materials, such as spent nuclear fuel.

The various advantages of the products of the present invention and the method for their manufacture will be evident from the present specification but a few will be specifically mentioned now.

The coated articles of this invention may be made to have a comparatively high $B^{10}$ content and neutron absorbing capability and yet be desirably thin and light in weight. They may be produced more efficiently and economically and are easily cut, stamped, machined or shaped to desired condition or form. The product manufactured is of desirable tensile strength and various other physical properties and additionally, can be distorted or bent without harmful deterioration. Thus, while the coated article may crack when bent too far it will often still be in one piece without losing power as a neutron absorber and can still be used successfully. In such latter respects it differs greatly from neutron absorbing plates of greater thicknesses. Also, the present product lends itself to easier and quicker processing. Furthermore, the invented article is producible in higher concentrations of $B_4C$ than articles made only from $B_4C$ particles-polymer mixes laminated with backing or base members and are of reproducible neutron absorbing capability and such capability may be increased or decreased, as desired, with relatively minor changes in article composition and manufacturing procedures.

The invention will be readily understood from the specification and the drawing, considered in conjunction therewith, in which:

FIG. 1 is a perspective view of a neutron absorbing composite sheet article of this invention;

FIG. 2 is an enlarged partial sectional view along plane 2—2 of FIG. 1;

FIG. 3 is a diagrammatic representation of a process for the manufacture of preferred neutron absorbing articles of this invention;

FIG. 4 is a schematic representation of a portion of a process of FIG. 3; and

FIG. 5 is a top sectional plan view of a portion of a storage rack for spent nuclear fuel, illustrating location of neutron absorbing articles of this invention between walls of holding means therefor and located about an inner volume which is for the storage of neutron emitting material.

In FIG. 1 there is illustrated neutron absorbing article 11, shown as a thin, flat, elongated, normally vertically positioned composite coated article, with individual larger particles of boron carbide, represented by numeral 13, shown in a matrix 15 of a mixture of polymeric material and finer boron carbide particles. A preferred final coat of polymeric material over the surface article is not identified in this figure but is shown in FIG. 2.

In FIG. 2 fiberglass or other suitable inorganic, synthetic organic polymeric or natural fibrous material, in cloth form is shown (17) with fine boron carbide particle-phenolic polymer matrices 15 and 19 on sides of it, with matrix 15 having larger boron carbide particles 13 embedded in it, yet extending distances beyond the surface plane thereof. Outer coating 21 covers with phenolic or other suitable polymer the coarser boron carbide particles and the matrix in which they are embedded. Optionally, the outer sizing, sealing or additionally binding coating may also be applied to article side 19. Because the filling coat of polymer essentially penetrates into the fibers or into interstices in the base cloth or backing member between the fibers and does not add appreciably to the thickness thereof, this filling, which is "between" the cloth and the boron carbide-polymer matrices, is not illustrated in FIG. 2.

In FIG. 3 a preferred manufacturing process is diagrammatically illustrated. In it the basic backing member, preferably a fiberglass cloth, is resin filled, after which the resin is partially cured, to an easy-to-handle, yet flexible solid. To one side of the cloth there is subsequently applied a mixture of curable resin and relatively fine boron carbide particles, after which the resin is partially cured, as previously described. Another such mixture of resin and boron carbide particles, sometimes of a slightly different composition or of slightly different proportions, is applied to the other side of the backing member and subsequently coarser boron carbide particles are adhered to such side and pressed into the resin thereof, after which such resin is partially cured, as previously described. A size coat is next applied over the adhered coarse particles and is partially cured. Then the article, often previously in web or sheet form of indeterminate length or of length greater than that desired, is cut to size and the sheets are stacked and finally, preferably completely cured (to C-stage) under a shape-controlling load. Numerals are applied to the various components and processing steps in FIG. 3 but will not be referred to further at this point because they are primarily to assist in identification of particular components and processing operations and their relations to such are self-evident.

In FIG. 4 a continuous belt 61 of a backing member material, such as fiberglass cloth, coated with uncured liquid resin-boron carbide mix, moves in the direction of arrow 63 beneath distributor 65, from which coarser boron carbide particles 67, in a regular stream, drop onto it. The belt, sheet or web passes under roller 77 which presses the coarser particles into the resin-particles mix (without the roller contacting the resin) and then travels over roller 69 so that boron carbide particles 71, not held to the web by the resin, fall off it into collecting bin or trough 73. The backing member, coated with partially cured boron carbide-polymer mix on one side thereof (the roll side) and with uncured boron carbide-polymer mix with coarser boron carbide particles adhering thereto on the other side, passes under roll 75 and is taken off for further treatment, e.g., partial curing, coating, partial curing, final curing, etc. As described in FIG. 3 the final cure is preferably effected while the article is being held in shape.

FIG. 5 illustrates a bundle of spent nuclear fuel rods or other nuclear material 90, only some of which is shown, located inside a casing 88 and in an aqueous (or other) medium (not specifically identified) inside a portion 83 of a storage rack (or other container) for such nuclear material. Storage rack portion 83 includes outer wall 85 and inner wall 87, held apart by vertical rods 89, to which they may be welded or otherwise affixed, with neutron absorbing articles 11 of this invention within such walls and surrounding the neutron emitting spent nuclear fuel rods 90, thereby absorbing neutrons emanating from the rods and protecting the external environment against the effects of the storage of the spent nuclear fuel. In the drawing the thickness of articles 11 has been exaggerated.

The boron carbide particles, employed for their neutron absorbing capability, will normally be in rather finely divided particulate form. Thus, such particles will generally be within the No. 10 to No. 400 sieve range, U.S. Sieve Series, signifying that they will pass through a No. 10 sieve and rest on a No. 400 sieve. Usually the finer particles, utilized in forming matrices with polymeric materials, to be described later, will be of particle sizes in the No. 170 to No. 400 sieve range, preferably passing through a No. 200 sieve. The coarser boron carbide particles employed to form a heavier coating on one side of the article, are normally in the No. 10 to No. 200 sieve size range, preferably being from 35 to 200, more preferably 60 to 200 and sometimes most preferably in the 60 to 120 range. It is important that fairly finely divided boron carbide particles be employed, as described, to produce effective bonds to the polymeric material to be cured about such particles and to obtain a uniformly distributed boron carbide content in the polymeric matrix.

Boron carbide often contains impurities, of which iron (including iron compounds) and $B_2O_3$ (or impurities which can readily decompose to $B_2O_3$ on heating) are among the more common. Both of such materials, especially $B_2O_3$, have been found to have deleterious effects on neutron absorbing products in certain environments and therefore contents thereof are desirably limited. For example, although as much as 3% of iron or its compounds may be tolerable in the boron carbide particles of the boron carbide absorbers, preferably the iron content is held to 2%, more preferably to 1% and most preferably is less than 0.5%. Similarly, to obtain best absorbing articles, especially when they are of long, thin flat form, it is useful to limit the $B_2O_3$ content (including boric acid, etc., as $B_2O_3$), usually to no more than 2%, preferably to less than 1%, more preferably to less than 0.5% and most preferably to less than 0.2%. Of course, the lower the iron and $B_2O_3$ contents the better.

The boron carbide particles utilized will usually contain the normal isotopic ratio of $B^{10}$ but may also contain more than such proportion to make even more effective neutron absorbers. Of course, it is also possible to use boron carbide with a lower than normal percentage of $B^{10}$ (the normal percentage being about 18.3%, weight basis, of the boron present) but such products are rarely encountered and are less advantageous with respect to neutron absorbing activities.

Other than the mentioned impurities, normally boron carbide should not contain significant amounts of components other than $B_4C$ (boron and carbon in ideal combination) and minor variants of such formula unless the $B_4C$ is intentionally diminished in concentration by use of a diluent or filler material, such as silicon carbide and others, various of which are mentioned in the Naum, Owens and Dooher application, previously cited. For satisfactory absorbing effectiveness at least 90% of the boron carbide particles should be boron carbide, preferably at least 94% and more preferably at least 97% and the $B^{10}$ content of the particles (from the boron carbide) for best absorption characteristics will be at least 12%, preferably at least 14% (14.3% $B^{10}$ is theoretically present in pure $B_4C$). To maintain the stability of the boron carbide-phenolic polymer article made under severe operating conditions it is often considered to be important to limit the contents of halogen, mercury, lead and sulfur and compounds thereof, such as halides, in the final product and so of course, such materials, sometimes found present in impure phenolic resins, solvents, fillers and plasticizers, will be omitted from those and will also be omitted from the composition of the boron carbide particles to the extent this is feasible. At the most, such materials will contain no more of such impurities than would result in the final product just meeting the upper limits of contents allowed, which will be mentioned in more detail in a subsequent discussion with respect to the phenolic polymer and the resins from which it is made. Although it is important and highly desirable that the boron carbide and other components employed in the making of the present articles should, for best results, contain little or no halogen, mercury, lead, sulfur and other objectionable materials, it is considered that for some applications wherein the presence of such materials is not considered to be harmful the specification limits set for contents thereof may be increased and in some instances no such limits will be imposed. Thus, in various applications, as when resistance to storage pool media, such as water and boric acid solutions, is not required, halogens, mercury, etc., may often be present without adversely affecting characteristics of the present articles.

The solid, irreversibly cured polymeric material, cured to a continuous matrix about the finer boron carbide particles and cured so as to hold the coarser boron carbide particles in place, which polymer may also be employed as a preliminary filling coating on the backing member and as an overcoat for one side of the article, is preferably made from a phenolic resin which is in liquid form at normal temperatures, e.g., room temperature, 20°–25° C., but also may be from a resin which becomes liquid at an elevated temperature at which application of the resin may be effected in the present processes. The phenolic resins constitute a class of well-known thermosetting resins. Those most useful in the practice of the present invention are condensation products of phenolic compounds and aldehydes. Of the phenolic compounds phenols and lower alkyl- and hydroxy-lower alkyl-substituted phenols are preferred. Thus, the lower alkyl-substituted phenols may be of 1 to 3 substituents on the benzene ring, usually in ortho and/or para positions and may be of 1 to 3 carbon atoms, preferably methyl, and the hydroxy-lower alkyls present will similarly be 1 to 3 in number and of 1 to 3 carbon atoms each, preferably methylol. Mixed lower alkyls and hydroxy-lower alkyls may also be employed but the total of substituent groups, not counting the phenolic hydroxyl, is preferably no more than 3. Although it is possible to make a useful product with the phenol of the phenol aldehyde type resin essentially all substituted phenol, some phenol may also be present with it, e.g., 5 to 50%. For ease of expression the terms "phenolic type resins", "phenol aldehyde type resins" and "phenol formaldehyde type resins" may be employed in this specification to denote more broadly than "phenol formaldehyde resins" the acceptable types of materials described which have properties equivalent to or similar to those of phenol formaldehyde resins and trimethylol phenol formaldehyde resins when employed to produce thermosetting polymers in conjunction with boron carbide particles (or boron carbide plus diluent particles, e.g., silicon carbide and other particles, as described herein).

Specific examples of useful "phenols" which may be employed in the practice of this invention, other than phenol, include cresol, xylenol and mesitol and the hydroxylower alkyl compounds preferred include mono-, di- and trimethylol phenols, preferably with substitution at the positions previously mentioned. Of course, ethyl and ethylol substitution instead of methyl and methylol substitution and mixed substitutions wherein the lower alkyls are both ethyl and methyl, the alkylols are both methylol and ethylol and wherein the alkyl and alkylol substituents are also mixed, are also useful. In short, with the guidance of this specification and the teaching herein that the presently preferred phenols are phenol and trimethylol phenol, other compounds, such as those previously described, may also be utilized providing that the effects obtained are similarly acceptable. This also applies to the selection of aldehydes and sources of aldehyde moieties employed but generally the only aldehyde utilized will be formaldehyde (compounds which decompose to produce formaldehyde may be substituted).

The phenolic or phenol formaldehyde type resins utilized are employed as either resols, novolaks or mixes. The former are generally called one-stage or single-stage resins and the latter, with hexamethylenetetramine or equivalent present, are two-stage resins. The major difference is that the single-stage resins include sufficient aldehyde or alkylol moieties in the partially polymerized lower molecular weight resin to completely cure the polymer to cross-linked and thermoset state upon application of sufficient heat for a sufficient curing time. The two-stage resins or novolaks plus curing agent are initially partially polymerized to a lower molecular weight resin without sufficient aldehyde or equivalent present for irreversible cross-linking so that a source of such material, such as hexamethylenetetramine, is added to them in order for a complete cure to be obtained by subsequent heating. Either type of resin or mixtures thereof may be employed to make phenolic polymers such as those described herein. When the polymerization reaction in which the resin is formed is acid catalyzed HCl will usually be avoided (to minimize chloride content in the resin) and formic acid or other suitable chlorine-free acid may be used.

Preferably the resin utilized is one which is normally liquid, even without the need for employment of solvents, although some water will often be present with it, e.g., 3 to 15% or preferably 6 to 12%. Preferably such resin will be a resol and the molecular weight of the resin will be in the range of 200 to 1,000, preferably 200 to 750 and most preferably 200 to 500. Thus, it is noted that the resin will usually be a monomer, dimer or trimer and preferably is a mixture of monomer and dimer. Generally the resin content of the liquid state resin preparation employed will be from 50 to 90%, preferably being about 55 to 85%. The solvent content, usually principally water, may be from 3 to 30% but is normally within the ranges previously given. Other components of the liquid resin include the aldehyde and phenolic compound from which it is made. Thus, for example, in a liquid unmodified phenolic resin of the single-stage type based principally on the condensation product of trimethylol phenol and formaldehyde, there may be present about 82% of dimer, about 4% of monomer, about 2% of trimethylol phenol, about 4% of formaldehyde and about 8% of water. Among the useful liquid products that may be employed are Arotap 352-W-70, which is of the description previously given for the trimethylol phenol formaldehyde and is especially low in halogen content; Arotap 352-W-71; Arotap 358-W-70 (also called Arofene 358-W-70), a formic acid catalyzed phenol formaldehyde resin of properties like that of Arotap 352-W-70; Arotap 8082-Me-56; Arotap 8095-W-50; Arofene 744-W-55; Arofene 986-Al-50; Arofene 536-E-56; and Arofene 72155, all manufactured by Ashland Chemical Company; PA-149, manufactured by Polymer Applications, Inc. and B-178; R3; and R3A, all manufactured by The Carborundum Company. All such resins will be modified when desirable (when contents of the following impurities are too high) to omit halides, especially chloride, halogens, mercury, lead and sulfur and compounds thereof or to reduce proportions thereof present to acceptable limits. In some cases the procedure for manufacture of the resin will be changed accordingly. Generally the viscosity of such resin at 25° C. will be in the range of 200 to 700 centipoises, preferably 200 or 250 to 500 centipoises. Usually the resin will have a comparatively high water tolerance, which will generally be from 200 to 2,000 or more percent and preferably will be at least 300%, e.g., at least 1,000%. Typical properties of a preferred resin, Arofene 358-W-70, are viscosity at 25° C. in the range of 250 to 500 centipoises, gel time of 14 to 19 minutes, solids content of 69 to 73% and pH of 7.9.

Although the phenolic resins and particularly the phenol formaldehyde type resins are highly preferred in the present applications other thermosettable resins may also be employed instead. These will not be described in the same detail as that given for the phenolic resins but the properties thereof will be similar. In some instances, it may be possible to utilize high softening point thermoplastic resins but generally this will not be preferred. Among the useful thermosetting polymers there may be mentioned the polyesters, epoxies, alkyds, diallyl phthalate, melamine and urea formaldehydes, polyurethanes and polyimides. More detailed descriptions of such materials and properties thereof may be found in the 1975–1976 Modern Plastics Encyclopedia, published by McGraw-Hill Inc., New York, N.Y., at pages 6–158 and 465–490 and in the Encyclopedia of Chemistry, 3rd Edition, by Hampel and Hawley, published by Van Nostrand Reinhold Company, New York, N.Y. In selecting other thermosetting (or thermoplastic, in certain circumstances) polymers consideration should be given to stability and strength retention upon radiation and resistance to softening or creeping at elevated temperatures within the range to which the present articles are normally exposed.

The backing member utilized is preferably a woven fiberglass cloth but it is also within this invention to employ other materials instead, providing that they have processing and product characteristics which enable them to be made according to the present method and utilized in the manner described. Thus, instead of using fiberglass cloth, it is within the invention to employ fibers and cloths of synthetic organic polymeric materials, carbon, graphite, boron carbide, silicon carbide, boron nitride, ceramics, aluminum silicate, alumina, silica, quartz, zirconia, basalt, various combinations thereof, e.g., fiberglass and polyester, carbon and fiberglass, and even natural polymers, such as cellulose, cotton, linen, jute and hemp, providing that they are sufficiently strong and resistant to radiation. Also, it is within the invention to employ these materials in sheet or film form or as perforated sheets, insofar as such can be made. Furthermore, such sheet materials and cloths, including non-woven cloths and felts, may be reinforced with strengthening materials such as glass fibers, carbon fibers, silicon carbide fibers, boron carbide fibers, graphite fibers and other equivalent fibrous reinforcements. The important determining factors for successful products are flexibility, for processing and final use, and radiation resistance, so that the backing member will not deteriorate unacceptably upon exposure to radiation, e.g., $1 \times 10^{11}$ rads. The particular use to which the product is to be put is important and various materials which might not stand up under excessive radiation can be used where the expected exposure is lower. Also, even for those materials which are unstable under radiation (and this applies to both the backing member and the coating[s] thereon), in some applications, like those wherein after manufacture the article is encased in a protective enclosure (which may be vented) some decomposition may be tolerable and in some cases even significant decomposition may not adversely affect the neutron absorbing capability of the product. For example, although polyester cloth is not preferred backing member material because of a lowering of tensile strength when it is exposed to massive radiation, leading to lower tensile strengths in products in which such cloth is used as a backing member, it may be acceptable in various applications, including those wherein it is held firmly in place, as between sandwiching metal walls, so that the $B_4C$ particle distribution is maintained regular.

Among other plastics or polymeric materials which may be employed as backing members there may be mentioned polyethylene, polypropylene, nylons, polyesters, polyethers, polyurethanes, polyacrylates and various other suitable thermoplastic and thermosetting materials, such as those described in the Modern Plastics Encyclopedia and the Encyclopedia of Chemistry publications cited above. Additionally, in some cases cotton and various other natural textile materials may be employed, alone or in mixtures.

The backing member, whether of a film or sheet, woven or non-woven, should normally be of a thickness in the range of 0.1 to 2 mm., preferably 0.1 to 1 mm. and most preferably 0.2 to 0.3 mm. The weight of such material, preferably cloth, will normally be from 50 or 100 to 1,000 or 2,000 g./sq. m. The denier may be varied as desired and the weaves of cloths may be any such found to be suitable but preferably will be such as to result in a flexible backing. Various thread counts may be employed but preferably they are in the range of from 20 to 100 for both warp and fill, usually from 30 to 80. The cloth may be pretreated with known non-halogenated adhesion promoting chemicals to promote adherence of resin to it. For example, fiberglass is normally treated with a known aminosilane treatment which increases the adhesion of phenolic resin to the glass. Also, usually before use any coatings on the cloth, fibers or sheet, such as starch sizes, oils, waxes, etc., will be removed.

The final neutron absorbing article is preferably 1 to 7 mm thick., more preferably about 1 to 4 mm. thick and most preferably about 1 to 2 or 3 mm. thick. The $B^{10}$ loading is from 0.001 to 0.1 g./sq. cm., with the higher loadings being more feasible when an additional coating of "coarse" $B_4C$ particles is laid on the "smooth" side of the present article so that coarse particles are on both sides thereof, or when two (or more) of the present articles are joined together, as by resin coating and polymerization, preferably at the "smooth" sides thereof. Usually the $B^{10}$ concentration is from 0.001 to 0.05 g./sq. cm., preferably 0.005 to 0.03 g./sq. cm. (for example 0.01 to 0.02 g./sq. cm.) and the weight of the final article is in the range of 100 to 5,000 g./sq. m., preferably 500 to 3,000 g./sq. m. Preferably the boron carbide particles in the finished article are so distributed that 3 to 25%, preferably 10 to 20% to the total boron carbide and $B^{10}$ is on one side of the backing member and the balance is on the other side, said balance being divided between 10 and 35%, preferably 15 to 30% of fairly finely divided boron carbide particles (mixed in with polymer) and 40 to 80%, preferably 55 to 75% in larger particle form (adhered to said polymer layer). Thus, the particles on one side are of particle sizes in the No. 10 to No. 400 sieve range, preferably 60 to 400 sieve range and on the other side are of particles in the 170 to 400 sieve range, preferably through a No. 200 sieve and sometimes more preferably through a No. 230 sieve.

The most preferred embodiment of the invention is illustrated and has been described herein and will be that made by the preferred process to be described in detail, but in variations of the present invention the particles of boron carbide may be adhered to a suitable backing member by means of a preliminary uncured liquid resin coating without the utilization of filler coatings of polymer and of prior coats on the backing member of finely divided boron carbide particles-resin mixes. However, it is preferred to have both sides coated with at least some boron carbide particles in polymeric matrix for several reasons. The boron carbide particles help to increase the strength of the polymer and the ease of application thereof and furnish support for subsequent application(s) of resin, etc. Of course, when utilizing both sides of the backing member a greater total quantity of neutron absorbing $B^{10}$ can be included in the present particles. Also, with boron carbide particles on both sides of the backing member the backing member material is better protected against radiation effects, at least with respect to neutron emissions. Furthermore, by employing a greater concentration of boron carbide particles on one side than the other, that with the heavier concentration may be located facing the probable source of neutron emissions and thereby may better protect the material of the backing member.

The articles made will preferably include the same or closely related polymeric materials in the various layers and mixes and even when such are not employed it will be preferable to utilize polymers with similar curing properties so that a final, preferably complete cure of all the previously only partially cured resins may be effected at the end of the manufacturing procedure.

The products made are form-retaining, yet possess a sufficiently flexibity so that they do not break apart and do not have pieces and boron carbide particles disconnected from them when they are subjected to flexural stresses of moderate degrees. They can be broken apart intentionally but are often resistant to separation, even when bent over 90°, and are resistant to cracking when bent up to 30 or 45°. Also, they are light in weight and are of sufficient tensile strength so that they may be hung or "stood" in place. When free standing, with large sideward movements prevented by enclosing walls, as in a spent fuel storage rack, the product may take a sinuous shape but will still be effective as a satisfactory neutron absorber over the length of the container in which it is positioned. If subjected to stresses sufficient to crack a surface layer of boron carbide particles and polymer, the backing member will normally maintain the integrity of the product and prevent chipping off of pieces thereof. It has been found that even after radiation with as much as $10^{11}$ rads or more the products made, especially if based on a fiberglass backing, often have tensile strengths in excess of 400 kg./sq. cm. Normally the present articles have tensile strengths over 15 kg./sq. cm., preferably over 100 kg./sq. cm. and more preferably over 350 kg./sq. cm. In fact, with phenol formaldehyde type polymers being employed, although the tensile strength of the product diminishes somewhat over lengthy periods of exposure to radiation, up to as much as $10^{11}$ rads, during initial exposure it may even increase slightly, apparently due to the effect of radiation in promoting even more complete cross-linking of the product, beyond the extent readily obtainable with the usual heat cures.

Although the products of this invention are useful in various applications wherein it is desirable to absorb neutrons from nuclear materials, such as nuclear wastes and nuclear fuels, most preferably they are employed in storage racks for spent nuclear fuel. In any such application it is important that a continuous layer of $B^{10}$ be present so that there is a statistical distribution of boron carbide particles and $B^{10}$ atoms that is uniform and homogeneous so that neutrons emitted from stored nuclear material will pass near enough to $B^{10}$ atoms so as to be "absorbed" by them. It is also important that the $B^{10}$ concentration is capable of being accurately designed into the article and that such is producible commercially so that nuclear power installations may have racks for spent fuel positively protected against releases of neutrons to the environment.

When the present neutron absorbers are utilized in a spent fuel storage rack for storage of fuel from either a BWR or PWR installation or when they are used in other nuclear shielding applications, single articles having a length from 100 to 2,000 times the thickness and a width from 50 to 500 times the thickness may be employed. For example, when the product is about 1 to 2 mm. thick the length may be about 50 to 200 cm., with the width being about 10 to 30 cm. and with preferred dimensions being about 80 to 100 cm. and 20 to 25 cm. The absorbers may be mounted singly in the storage rack enclosure, one at each wall thereof, as illustrated in FIG. 5, or a plurality of such articles may be utilized face to back or back to back to obtain the desired extent of neutron absorption. In both cases, it is within the invention to mount one or a plurality of such articles vertically atop other article(s) so as to obtain the desired height of protection.

A preferred method of making the composite neutron absorbers of this invention comprises applying to a first side of a backing member a mixture of thermosettable normally liquid synthetic organic polymeric material and finely divided boron carbide particles mixed therewith, partially curing the thermosettable polymeric material of the mix so that it no longer runs (is solid), coating the other side of the backing member with a thermosettable, normally liquid synthetic organic polymeric material, which may or may not be pre-mixed with finely divided boron carbide particles, applying boron carbide particles of generally larger particle size than those applied to the first side to the polymeric material on said other side of the backing member, pressing the particles into the resin, partially curing the resin and finally curing the polymer to cross-linked permanently set or "stage C" form. Preferably, before beginning the process the backing member is filled with a normally liquid polymeric material, which is partially cured to solid form. Also, it is preferred that the coarser boron carbide particles be adhered to a mix of finer boron carbide particles and thermosettable polymer rather than to the polymer only. Additionally, at the end of the process it is desirable for the side of the product with the coarser boron carbide particles on it to be coated with a protective layer of thermosettable resin and for such layer and the other only partially cross-linked polymer(s) present to be completely or as nearly as feasible completely cross-linked together. For ease of handling and to prevent sticking of pressing means to the product, when being cured to flat or other desired shape, such external coating should first be partially cured so as to make a solid product.

The initial sizing of both sides of the backing member is partially cured after an effective add-on of resin of about 20 to 150 g./m., which is usually about 0.1 to 0.5 times the weight of the backing member. The resin applied will normally be of a viscosity of about 200 to 1,000 centipoises, preferably 250 to 500 centipoises at room temperature and will be of a solids content between 50 or 60 and 90%. After curing, which will be at a temperature in the range of 95° to 125° C. and will take place over a period of 20 minutes to three hours, the coated backing member is then back filled with a mixture of phenolic resin and fine boron carbide particles well dispersed therein, as by mixing in a high shear mixer, such as a Cowles mixer, over a period of from about 10 minutes to one hour. The initial polymer coating may be made by dipping and passing through squeeze rolls and the back filling may be effected by means of knives, rollers, doctor blades, etc., using standard equipment employed in making similar coatings, such as in making coated abrasive products. Preferably the various operations are conducted continuously. The proportion of boron carbide particles and phenolic resin in the back fill is preferably about 50:50 but may vary from 25:75 to 75:25. In this operation it is desirable for the mix to have a viscosity at 32° C. of 3,000 to 10,000 centipoises, preferably 6,000 to 8,000 centipoises and such viscosity may be adjusted by the addition of solvent, preferably water, with the amount of such addition usually being from ½ to 5% of the weight of the resin applied. After back filling, which deposits about 20 to 100% of the weight of the original backing member of boron carbide particles, together with approximately the same weight of polymer, a partial cure like that previously described for the fill coat is effected. The back fill strengthens the backing member and fills it to support the make coat to be applied next. Then, a make coat is applied, comprising about the same proportion of the resin and finely divided boron carbide particles (mixed the same way) and with the addition of enough water so that the resulting viscosity is about 700 to 2,000 centipoises, preferably 1,000 to 1,500 centipoises, at 32° C. A sufficient quantity of the polymer-boron carbide particles mix is applied to the previously uncoated (with boron carbide) side of the backing member to result in about 25 to 125%, preferably 50 to 100% of boron carbide deposited thereon (on an original backing member weight basis). Such making coat, while it is still wet and uncured, has coarser boron carbide grains applied to it, as illustrated in FIG. 4, in an even distribution over the entire surface thereof to the extent that about 150% to 350%, on an original backing member weight basis, of coarser boron carbide grains is applied onto and is pressed into the resin. Uniform distribution is obtained because the polymer holds the particles where they fall into contact with it and they are applied evenly. The product resulting is then partially cured, preferably over a period of 1 to 5 hours at a temperature of about 95° to 125° C., more preferably over about two hours at a temperature of about 107° C. Finally, a clear size coat of resin is applied to the product on the coarse boron carbide side to deposit about 25 to 75% by weight thereof, on an original backing member weight basis. Such material is again partially cured and/or dried to make it sufficiently hard so that it can be rolled and/or cut to desired lengths. Up to this time preferably the entire operation takes place utilizing a continuous web of backing member but this may be modified to employ pieces thereof at any desirable stage. However, normally after partial curing of the final size coating or overcoat the web is cut to desired lengths, if not previously cut, and pieces thereof are positioned one atop another between flat plates located every 3 to ten articles high. Such plates may be of aluminum or stainless steel, which may be multiply stacked with the articles to be cured, placed in an oven and cured sufficiently to finally and completely or nearly completely cross-link the resin(s). The temperature employed for such cure may be in the range of 95° to 320° C., preferably 95° to 200° C. and more preferably 95° to 125° C. The curing time may be from 2 to 50 hours, preferably from 20 to 40 hours, with longer curing times being employed for lower temperature cures. The cure effected will normally be to over 90% of complete cross-linking of the polymer, preferably over 95% thereof and more preferably 99 to 100% thereof, to the final C-stage.

Although in the above description the resinous material employed is normally liquid at room temperature or under the conditions of application it is also within this invention to utilize a mixture of particulate resin and normally liquid resin, such as mixtures thereof described in the Owens patent application previously referred to and incorporated by reference. However, use of normally liquid resin is preferred.

The following examples illustrate but do not limit the invention. Unless otherwise indicated, all parts are by weight and all temperatures are in ° C. in the examples, the rest of this specification and in the claims.

EXAMPLE 1

A fiberglass cloth backing member of the type known as 8 harness satin having 57 threads in the warp and 54 in the fill and of a thickness of 0.23 mm. and weighing about 300 g./m., which has been heat cleaned to remove any sizing thereon, such as oils and starches and which has previously been treated by an aminosilane treatment to enhance adhesion of phenolic resin to fiberglass, is dipped into Ashland Chemical Company phenol formaldehyde resin identified as Arotap 358-W-70, the characteristics of which have been previously described in this specification, and the coated cloth is passed through squeeze rolls to remove any excess resin. The resin viscosity is suitable for dip application but if too high it may be lowered by use of solvent(s) and/or heat (but if heat is used the temperature-time combination will be insufficient to effect curing). The backing employed is one wherein the weave has a 7 by 1 interlacing, in which the filling threads float over 7 warp threads and under 1 warp thread. The resin is dried or partially cured onto the backing member cloth at a temperature of 107° C. for about one hour. The weight of the cloth indicates a pickup of about 17% (on the original cloth weight) or resin. The dip coated cloth is then back filled on its weave side with a 50:50 mix of the normally liquid phenolic resin and boron carbide particles which pass through a No. 200 sieve and most of which fail to pass a No. 400 sieve. The mix, made by mixing for about 20 minutes in a Cowles or equivalent high energy mixer, is of 5,000 parts of the resin and 5,000 parts of the fine boron carbide particles, with 100 parts of water added to result in a product of a viscosity of about 7,000 centipoises at 32° C. The back fill weight, as applied, is about 100% of that of the original cloth and when dried adds 45% (original cloth weight basis) of boron carbide. The back filled cloth is then partially cured, in the way described earlier for the initial resin application to the cloth.

The back fill mix formula is then modified by the addition of resin to produce a 55:45 resin:boron carbide particles mix and a small amount of water is added so as to reduce the viscosity to 1,275 centipoises at 32° C. This mix is then applied to the other side of the previously dipped and back filled backing member so that a total weight of 175% of such material (original cloth weight basis) is applied as a make, which gives an addition of 75% (same basis) of boron carbide particles. The make coat, while it is still wet, has gravity-fed onto it from a distributor hopper boron carbide particles of sizes in the No. 60 to No. 200 sieve range to the extent that such cover the wet resin and excess particles are atop the covering layer. The coarse boron carbide grain is applied evenly, rolled so that it penetrates the resin-finer particles layer and excess is removed by turning the cloth from horizontal to vertical and further positions and letting unadhered particles fall off. A total of 225% (same basis) of "coarse" boron carbide grain is applied in this manner.

The product, now with a total of about 345% of boron carbide (same basis) thereon, is then dried and/or partially cured so that it can be handled, which takes about two hours at 107° C. A final clear size coat of resin is then applied (about 50% on a wet basis and about 40–45% on a dry basis) to the "coarse" side and the coated product is then dried and/or partially cured to such a state that it can be rolled and cut into desired lengths. The loading of boron carbide at such stage is about 1.035 kg./sq. m. or about 0.1 g./sq. cm. This corresponds to about 0.014 g./sq. cm. of $B^{10}$.

The partially cured material is then cut into pieces approximately 25 cm. by 75 cm. (it is about 1 mm. thick) and the pieces are fully cured by drying under weight (flat aluminum plates plus other articles are used to hold the materials flat) in an oven over a period of 30 hours at a temperature of 107° C.

The articles made, when tested for radiation exposure properties, are found to average about 450 kg./sq. cm. in tensile strength after exposure to $10^{11}$ rads whereas initial tensile strength, without exposure to radiation, is about 700 kg./sq. cm. After exposure the products look normal and can be flexed 20° without breaking and can be bent 110° without coming apart.

When installed in a storage rack for spent nuclear fuel, a part of which is of the design illustrated in FIG. 5, the present neutron absorbing articles will be effective neutron absorbers.

In a similar manner, various other of previously described backing members and polymers may be used and different size boron carbide particles may be employed. Also, some of the steps described in this example may be omitted, (such as the filling, back filling and final sizing) as previously taught and the adhering resin for holding the coarse $B_4C$ particles may be used without additional fine $B_4C$ with it. The products resulting will be satisfactory neutron absorbers in applications like those described herein and in various other applications in which neutron absorption from nuclear fuels, etc., is desirable.

EXAMPLE 2

A continuous web, 30.5 cm. wide and 4.5 m. long, made of Deering-Milliken 76 by 36 heat set polyester drill, with a weight of 21 g./m., which has been heat set to reduce elongation, and which has a tensile strength of 53.7 kg./cm. width in warp and about ⅓ of that in fill, is fill coated with Ashland Chemical Company Arotap-358-W-70 resin by dipping into the resin and the excess resin is removed by passing the cloth between pressure rollers. The resin is cured in the manner described in Example 1 and the add-on thereof is about 60 g./sq. m. Next, a cloth filling mix is made from a minus No. 230 sieve fraction of a boron carbide powder and resin, with the proportion of boron carbide powder being equal to that of the resin. The boron carbide employed is a 60 mesh and finer product of The Carborundum Company and the proportion of such material under 230 mesh is about 25%, with a proportion over 120 mesh being about 50%. The resin-boron carbide mix is made with 1/80th thereof of water being added to make a 7800 centipoise viscosity mix at 32° C. This cloth filling mix is applied to the polyester drill with knife application at a speed of about 3 m./minute. The weight of the mix applied is about 400 g./sq. m. and there was only very slight penetration of the web by the mix. The filled polyester drill is dried at 66° C. for ½ hour and is subsequently dried and partially cured for two hours at 93° C., hanging open in a festoon rack.

A make coating mix of 50 parts of the resin, 40 parts of the boron carbide particles (through 230 mesh) and 4 parts of water is made, having a viscosity of 850 centipoises at 32° C. and is applied to the reverse side of the filled polyester drill at the rate of about 450 g./sq. m. The plus 120 mesh fraction of the boron carbide particles is then gravity coated onto the uncured make coating mix, using apparatus such as illustrated in FIG. 4 and the grains of boron carbide are pressed into the resin, etc. without the pressing roll contacting the resin. The excess resin is removed, as shown in FIG. 4, and the article is cured partially in the manner previously described. About 600 g./sq. cm. of boron carbide particles are thusly adhered to the cloth. After partial cure is effected the material is roll coated with straight resin on the coarse grain surface thereof, having a viscosity of 285 centipoises at 32° C., with the wet coating applied being at the rate of about 190 g./sq. m. The same partial curing heating cycle is used as was previously described. The material is then removed from the festoon rack, cut to pieces about 89 cm. long (and 30.5 cm. wide) and these are finally cured to cross-linked resin state in flattened and weighed down form (using aluminum plates on stacks of the articles) over a period of 30 hours at a temperature of about 107° C. The final sheets made have a thickness of about 1.3 mm. and contain about 0.125 g. $B^{10}$/sq. cm.

When subjected to intense test radiation of $1 \times 10^{11}$ rads of electron radiation over 25 hours the material remains in its original form and possesses sufficient tensile strength to make it useful as a neutron absorber in spent fuel rack applications. However, it is much stronger in tension prior to radiation testing. Thus, initial tensile strengths may be in excess of 5,000 kg./sq. cm. but even after radiation the strength, although diminished, will be in excess of 15 or 20 kg./sq. cm.

Instead of using the polyester drill mentioned in this example other cloths of other materials previously described in this specification may be substituted, as may be other resins and boron carbide particle fractions. Also, mixtures of each of such components may be employed. The products resulting will be useful neutron absorbers.

The various advantages of the present invention have already been described but one additional advantage, which may be self-evident from the foregoing description, should be mentioned. By the present method of application of the coarser boron carbide particles to the backing member greater concentrations of boron carbide particles can be obtained in the article because there is no need to blend the adhering particles into the resin, which might make a mix of excessive viscosity. Also, a lesser quantity of resin may be employed.

The invention has been described with respect to examples and various illustrations thereof but is not to be limited to these because it will be evident that one of skill in the art, with the present disclosure before him, will be able to utilize equivalents and substitutes for parts of the invention without departing from it.

What is claimed is:

1. A composite, neutron absorbing, coated article comprising a backing member of woven fiberglass cloth, a trimethylol phenol formaldehyde polymer coating or a plurality of such coatings on said cloth and boron carbide particles held to said backing member by said coating or plurality of said coatings, which boron carbide particles are partially uncoated by said coating or coatings and project past said coating or coatings in a direction or directions opposite to that or those of the backing member and are of sizes in the No. 60 to 400 sieve range and in which article the $B^{10}$ loading is in the range of 0.001 to 0.1 g./sq. cm.

2. A composite, neutron absorbing, coated article comprising a backing member having a coating on one side thereof of phenolic polymer with boron carbide particles evenly distributed therein of particle sizes in the No. 60 to 400 sieve range and held to the backing member by such polymer and on the other side having a coating of phenolic polymer with boron carbide particles evenly distributed therein of particle sizes in the No. 170 to 400 sieve range and held to the backing member by such polymer.

3. A neutron absorbing article according to claim 2 wherein the backing member is a woven fiberglass cloth, the phenolic resin is a trimethylol phenol formaldehyde polymer and the $B^{10}$ loading is in the range of 0.005 to 0.03 g./sq. cm.

4. A composite, neutron absorbing, coated article which is from 1 to 7 mm. thick and comprises a backing member of fiberglass cloth, a synthetic organic polymeric coating of cured phenol formaldehyde type resin on a surface thereof and boron carbide particles of particle sizes in the No. 10 to No. 400 sieve range held to said fiberglass cloth backing member by said coating.

5. A neutron absorbing article according to claim 4 wherein the backing member is a woven fiberglass cloth, the article is from 1 to 4 mm. thick and the $B^{10}$ concentration is from 0.001 to 0.1 g./sq. cm.

6. A neutron absorbing article according to claim 5 wherein the woven fiberglass cloth is of a thickness in the range of 0.1 to 2 mm. and the weight thereof is from 50 to 2,000 g./sq. m.

7. A neutron absorbing article according to claim 6 wherein the phenolic resin is a trimethylol phenol formaldehyde polymer and the $B^{10}$ loading of the article is in the range of 0.005 to 0.03 g./sq. cm.

8. A neutron absorbing article according to claim 4 wherein the boron carbide particles held to the fiberglass backing member by the phenol formaldehyde polymer are partially uncoated by said polymer and project past said coating in a direction opposite to that of the backing member.

9. A shield or container for absorbing neutrons emitted by nuclear materials which comprises means for holding a nuclear material, means for holding neutron absorbing material or materials in position about said nuclear material and a composite, neutron absorbing, coated article or a plurality of such articles held in such means in position about the nuclear material, said neutron absorbing article comprising a backing member of fiberglass cloth, a coating of phenol formaldehyde polymer on a surface of said backing member and boron carbide particles held to said backing member by said coating, which particles are of sizes in the No. 10 to No. 400 sieve range and which articles are of a thickness in the range of 1 to 7 mm.

10. A composite, neutron absorbing coated article from 1 to 7 mm. thick and of a $B^{10}$ concentration from 0.001 to 0.1 g./sq. cm. comprising a thin and substantially flat woven fiberglass cloth backing member, a phenol formaldehyde type of polymeric coating on the backing member and boron carbide particles of particle sizes in the No. 10 to No. 400 sieve range held to the backing member by cured phenol formaldehyde type polymer, wherein the cloth is of a thickness in the range of 0.1 to 2 mm. and a weight from 50 to 2,000 g./sq. m., the backing member has a filling coating of phenolic polymer on both sides thereof, over said filling coating, on one side thereof, has a coating of the same phenolic polymer with boron carbide particles evenly distributed therein of particle sizes in the No. 60 to 400 sieve range and on the other side has a coating of the same phenolic polymer with boron carbide particles evenly distributed therein of particle sizes in the No. 170 to 400 sieve range.

11. A neutron absorbing article according to claim 10 with the coarse side coated with phenolic polymer, which is co-cured with the other coatings of such phenolic polymer.

12. A neutron absorbing article according to claim 11 wherein the $B^{10}$ loading is in the range of 0.005 to 0.03 g./sq. cm. and the weight of the article is in the range of 100 to 5,000 g./sq. m.

13. A neutron absorbing article according to claim 12 wherein the phenol formaldehyde type polymer is a trimethylol phenol formaldehyde polymer. thereof, over said filling coating, on one side thereof, has a coating of the same phenolic polymer with boron carbide particles evenly distributed therein of particle sizes in the No. 60 to 400 sieve range and on the other side has a coating of the same phenolic polymer with boron carbide particles evenly distributed therein of particle sizes in the No. 170 to 400 sieve range.

14. A composite, neutron absorbing, coated article comprising a thin and substantially flat cloth backing member, a phenol formaldehyde type polymeric coating on the backing member and boron carbide particles of particle sizes in the No. 10 to 400 sieve range held in place on the backing member by cured phenol formaldehyde type polymer, which neutron absorbing article is 1 to 7 mm. thick, with a $B^{10}$ concentration from 0.005 to 0.03 g./sq. cm. and weighs in the range of 100 to 5,000 g./sq. m., wherein the woven cloth material is of a thickness in the range of 0.1 to 2 mm. and the weight thereof is from 100 to 2,000 g./sq. m., the cloth backing member has a filling coating of phenolic polymer on both sides thereof and over said filling coating, on one side thereof, has a coating of the same phenolic polymer with boron carbide particles evenly distributed therein of particle sizes in the No. 10 to 400 range and on the other side has a coating of phenolic polymer with boron carbide particles evenly distributed therein of particle sizes in the No. 170 to 400 sieve range and wherein such No. 10 to 400 sieve coating is further coated with the same phenolic polymer which is co-cured with the other coatings of such polymer.

15. A neutron absorbing article according to claim 14 wherein the boron carbide particles held to the backing member by the synthetic organic polymeric coating or a plurality of said coatings include boron carbide particles partially uncoated by said coating and projecting past said coating in a direction opposite to that of the backing member.

16. A neutron absorbing article according to claim 14 wherein the backing member has a coating on one side thereof of phenolic polymer with boron carbide particles evenly distributed therein of particle sizes in the No. 60 to 400 sieve range and on the other side has a coating of phenolic polymer with boron carbide particles evenly distributed therein of particle sizes in the No. 170 to 400 sieve range.

* * * * *